(12) United States Patent
Di et al.

(10) Patent No.: US 10,528,618 B2
(45) Date of Patent: Jan. 7, 2020

(54) IMAGE PROCESSING AND MATCHING

(71) Applicant: PayPal, Inc., San Jose, CA (US)

(72) Inventors: Wei Di, San Jose, CA (US); Vignesh Jagadeesh, San Jose, CA (US); Robinson Piramuthu, Oakland, CA (US); Rohit Pandey, Amherst, NY (US); Anurag Bhardwaj, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 159 days.

(21) Appl. No.: 15/641,108

(22) Filed: Jul. 3, 2017

(65) Prior Publication Data

US 2017/0364536 A1    Dec. 21, 2017

Related U.S. Application Data

(63) Continuation of application No. 14/822,092, filed on Aug. 10, 2015, now Pat. No. 9,697,233.

(60) Provisional application No. 62/036,548, filed on Aug. 12, 2014.

(51) Int. Cl.
  *G06K 9/00* (2006.01)
  *G06F 16/583* (2019.01)
  *G06K 9/62* (2006.01)
  *G06K 9/46* (2006.01)

(52) U.S. Cl.
  CPC ........ *G06F 16/583* (2019.01); *G06F 16/5838* (2019.01); *G06K 9/4652* (2013.01); *G06K 9/4676* (2013.01); *G06K 9/6202* (2013.01); *G06K 9/6211* (2013.01); *G06K 9/6215* (2013.01); *G06K 9/6218* (2013.01)

(58) Field of Classification Search
  None
  See application file for complete search history.

(56) References Cited

U.S. PATENT DOCUMENTS

| | | | |
|---|---|---|---|
| 2009/0148068 A1* | 6/2009 | Woodbeck | G06F 17/30256 382/305 |
| 2012/0189207 A1* | 7/2012 | Doretto | G06K 9/4614 382/190 |
| 2012/0263385 A1* | 10/2012 | van Zwol | G06K 9/6211 382/201 |
| 2012/0263388 A1* | 10/2012 | Vaddadi | G06F 17/30247 382/225 |

(Continued)

*Primary Examiner* — Delomia L Gilliard
(74) *Attorney, Agent, or Firm* — Maschoff Brennan

(57) ABSTRACT

A configured machine performs image matching and retrieval of natural images that may depict logos. The machine generates and uses color-localized spatial masks, which may be computationally less expensive than spatial verification techniques. Key points are detected within images that form a reference database of images. Local masks are defined by the machine around each key point based on the scale and orientation of the key point. To utilize color information presented in logo images, ordered color histograms may be extracted by the machine from locally masked regions of each image. A cascaded index may then be constructed for both visual descriptors and color histograms. For faster matching, the cascaded index maps the visual descriptors and color histograms to a list of relevant or similar images. This list may then be ranked to generate relevant matches for an input query image.

20 Claims, 13 Drawing Sheets
(5 of 13 Drawing Sheet(s) Filed in Color)

(56) References Cited

U.S. PATENT DOCUMENTS

2013/0121600 A1* 5/2013 Lin ................... G06F 17/30262
                                                       382/224
2015/0356782 A1* 12/2015 Miller ..................... G06F 3/011
                                                       345/633

* cited by examiner

IMAGE PROCESSING AND MATCHING

RELATED APPLICATION

This application is a continuation of U.S. patent application Ser. No. 14/822,092, filed Aug. 10, 2015 (issued as U.S. Pat. No. 9,697,233 on Jul. 4, 2017), which claims the benefit of priority to U.S. Provisional Patent Application No. 62/036,548, filed Aug. 12, 2014, both of which are incorporated herein by reference in their entirety.

TECHNICAL FIELD

The subject matter disclosed herein generally relates to the technical field of machines that are configured to perform image processing and to the technologies by which such machines become improved compared to other image-processing machines. Specifically, the present disclosure addresses systems and methods to facilitate the processing and matching of images.

BACKGROUND

Various images may depict one or more logos (e.g., commercial logos, brand logos, corporate logos, marketing logos, trademarked logos, or other commercial iconography visually recognizable by consumers or other members of the public). In many situations, however, an image of a logo may depict the logo in a less than optimal manner. For example, an image may depict a logo as tilted (e.g., rotated by several angular degrees or even upside down), obliquely (e.g., at a shallow angle), with altered colors (e.g., due to lighting conditions or image processing), with poor brightness, with poor contrast, or any combination thereof.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

Some embodiments are illustrated by way of example and not limitation in the figures of the accompanying drawings.

DETAILED DESCRIPTION

Figure 1:
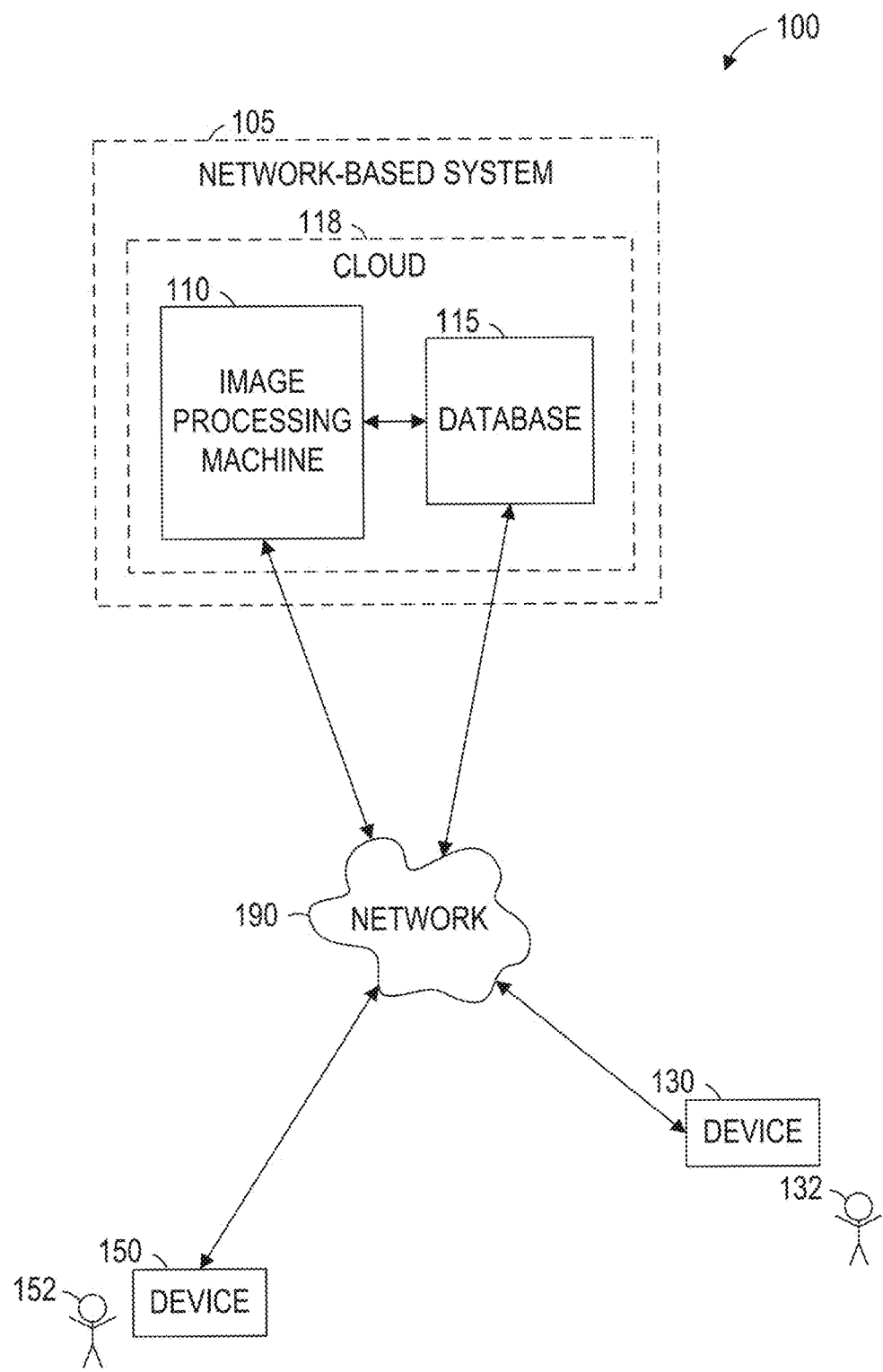
FIG. 1 is a network diagram illustrating a network environment suitable for logo matching and logo retrieval, according to some example embodiments.

Example methods (e.g., algorithms) facilitate image matching (e.g., for image retrieval), and example systems (e.g., machines) are configured to facilitate image matching (e.g., logo matching for logo retrieval). Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Image matching and retrieval (e.g., logo matching and retrieval from natural images) may be a challenging problem with potentially wide commercial applications. In situations where logos are depicted in images, many commercial applications would benefit from real-time indexing and retrieval of logo images with high accuracy. For example, one commercial application is "Shop By Brand," in which a user takes a picture of some merchandise that displays a brand logo and is then presented with products from that brand.

Many image retrieval solutions (e.g., logo retrieval solutions) are based on object retrieval. One popular technique is the Bag-of-Words (BoW) approach. In a typical BoW implementation, local feature descriptors (e.g., local feature vectors) extracted from images (e.g., determined via scale-invariant feature transform (SIFT) or speeded up robust features (SURF)) are clustered into a vocabulary of visual words which may then be used to encode each image as a histogram over visual words (e.g., a histogram showing which visual words among a predefined set of visual words are present in an image). In some situations, an inverted index may also be built for faster lookup at runtime when processing an image query.

Generally, local feature descriptors are robust to occlusion and minor distortions. However, traditional BoW approaches generally do not capture spatial information, and a spatial verification technique may be applied as a post-processing routine to an image list returned (e.g., as search results or similar results) from querying an image database that has been analyzed and indexed according to a BoW approach. An example of such a spatial verification technique is RANdom SAmple Consensus (RANSAC). Accordingly, the first retrieved images from querying the image database may be pruned to satisfy spatial consistency. Although spatial verification techniques like RANSAC tend to perform well in practice, they may be computationally expensive. Real-time image retrieval applications (e.g., logo retrieval applications) that have a fixed computing budget may forgo such computationally expensive operations and hence omit such spatial verification techniques.

However, in accordance with the systems and methods discussed herein, a machine may be configured to perform a spatial verification technique that takes into account strong color components in real-world images, such as images of logos (e.g., brand logos). The spatial verification technique is thus well-suited for logo matching and logo retrieval. Moreover, the systems and methods discussed herein are fast and efficient (e.g., computationally efficient).

Typically, logos contain specific patterns that are designed to be visually prominent, as well as visually discriminative, in order to convey a significant and distinct brand value to various viewers. Within an image that depicts a logo, regions containing such patterns usually are high contrast areas of the image (e.g., areas of the image with large differences in luminance). Local feature descriptors (e.g., SIFT descriptors) are well-suited to representing such high contrast areas. However, color layout information presented in brand logos may be useful as well.

Color layout information may provide multiple benefits in feature extraction. In general, color information is computationally inexpensive to process. Color information may capture a global property that is shared in common among multiple image regions and that complements the local properties (e.g., local luminance properties) captured by local feature descriptors. Moreover, many commercial brands and their corresponding logos are associated with distinct colors (e.g., with Pepsi® being associated with the color blue, and Coke® being associated with the color red). Thus, color may be an important feature in image recognition (e.g., logo recognition).

According to various example embodiments of the systems and methods discussed herein, the representation (e.g., encoding) of images, such as logo images (e.g., images depicting logos), uses BoW techniques but also incorporates a localized spatial color histogram feature (e.g., color words). In particular, a system of one or more machines may be configured to analyze images (e.g., logo images) and encode the images with a color-localized image representation (e.g., one or more color words representing clusters of local color descriptors) that captures at least some spatial color information around the local region of one or more local feature descriptors or clusters thereof (e.g., one or more visual words representing clusters of local feature descriptors). Furthermore, the system may be configured to perform a two-level cascaded indexing process that integrates both local color information (e.g., representing color words) and local feature descriptors (e.g., representing visual words) into a single index. This may provide a benefit of a much faster lookup (e.g., shorter lookup time) compared to combinations of a BoW approach with a traditional spatial verification technique (e.g., RANSAC).

FIG. 1 is a network diagram illustrating a network environment 100 suitable for image matching and image retrieval (e.g., logo matching and logo retrieval), according to some example embodiments. The network environment 100 includes an image processing machine 110 (e.g., a logo processing machine), a database 115, and devices 130 and 150, all communicatively coupled to each other via a network 190. The image processing machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services, such as image processing services, image search services, or both, to the devices 130 and 150).

One or both of the devices 130 and 150 may include a camera that allows capture of an image (e.g., an image depicting a logo) and communication of the image (e.g., as a submission to the database 115, or as a query image for comparison to other images in the database 115) to the image processing machine 110. The image processing machine 110 and the devices 130 and 150 may each be implemented in a computer system, in whole or in part, as described below with respect to FIG. 13.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is associated with the device 130 and may be a user of the device 130. For example, the device 130 may be a desktop computer, a vehicle computer, a tablet computer, a navigational device, a portable media device, a smartphone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a tablet computer, a navigational device, a portable media device, a smartphone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 11, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
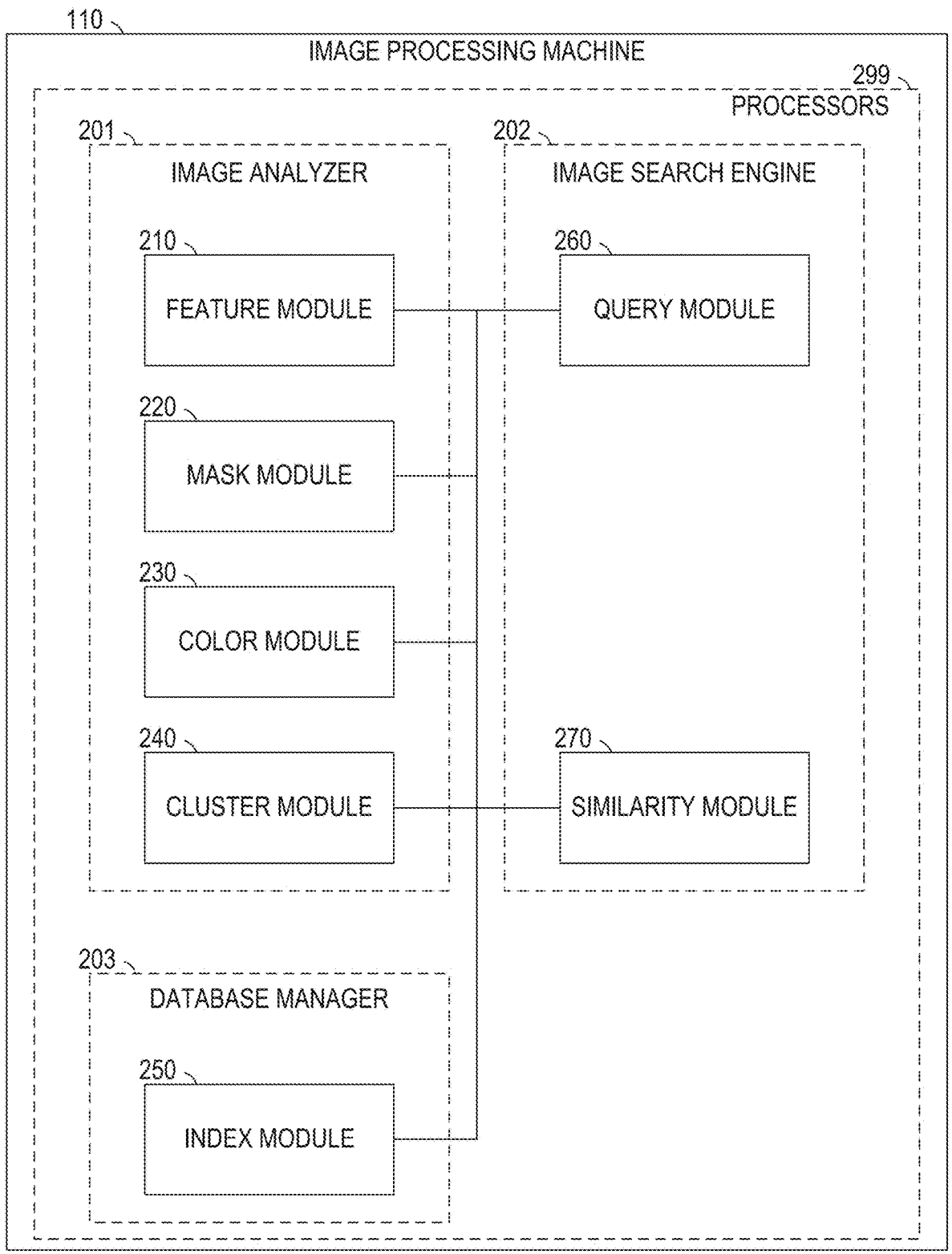
FIG. 2 is a block diagram illustrating components of the image processing machine, according to some example embodiments.

FIG. 2 is a block diagram illustrating components of the image processing machine 110, according to some example embodiments. The image processing machine 110 is shown as including one or more processors 299 that implement a feature module 210, a mask module 220, a color module 230, a cluster module 240, an index module 250, a query module 260, and a similarity module 270, all configured to communicate with each other (e.g., via a bus, shared memory, or a switch). As shown in FIG. 2, the feature module 210, the mask module 220, the color module 230, and the cluster module 240 may form all or part of an image analyzer 201, which may be configured to analyze a single image (e.g., query image submitted from the device 130) or a set of many images (e.g., millions of images) stored in the database 115. The query module 260 and the similarity module 270 may form all or part of an image search engine 202. Also, the index module 250 may form all or part of a database manager 203, which may be configured to index the database 115 (e.g., build a cascaded index of images stored in the database 115).

Any one or more of the modules described herein may be implemented using hardware alone (e.g., one or more of the processors 299) or a combination of hardware and software. For example, any module described herein may physically include an arrangement of one or more of the processors 299 (e.g., a subset of or among the processors 299) configured to perform the operations described herein for that module. As another example, any module described herein may include software, hardware, or both, that configure an arrangement of one or more of the processors 299 to perform the operations described herein for that module. Accordingly, different modules described herein may include and configure different arrangements of the processors 299 at different points in time or a single arrangement of the processors 299 at different points in time. Moreover, any two or more modules described herein may be combined into a single module, and the functions described herein for a single module may be subdivided among multiple modules. Furthermore, according to various example embodiments, modules described herein as being implemented within a single system or machine (e.g., a single device) may be distributed across multiple systems or machines (e.g., multiple devices).

Figure 3:
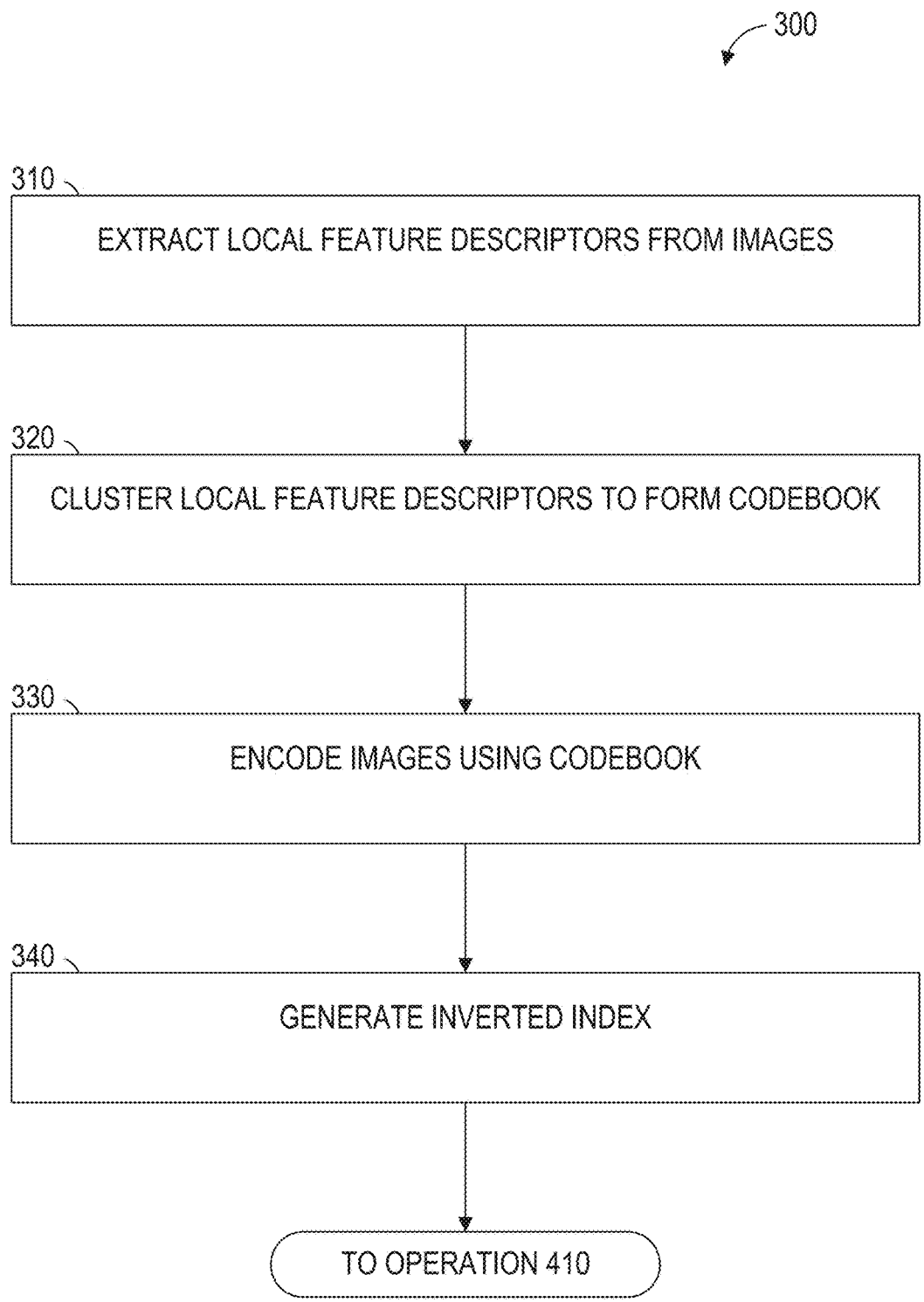
FIGS. 3 and 4 are flowcharts illustrating operations of the image processing machine in performing a method of analyzing one or more images, according to some example embodiments.
Figure 4:
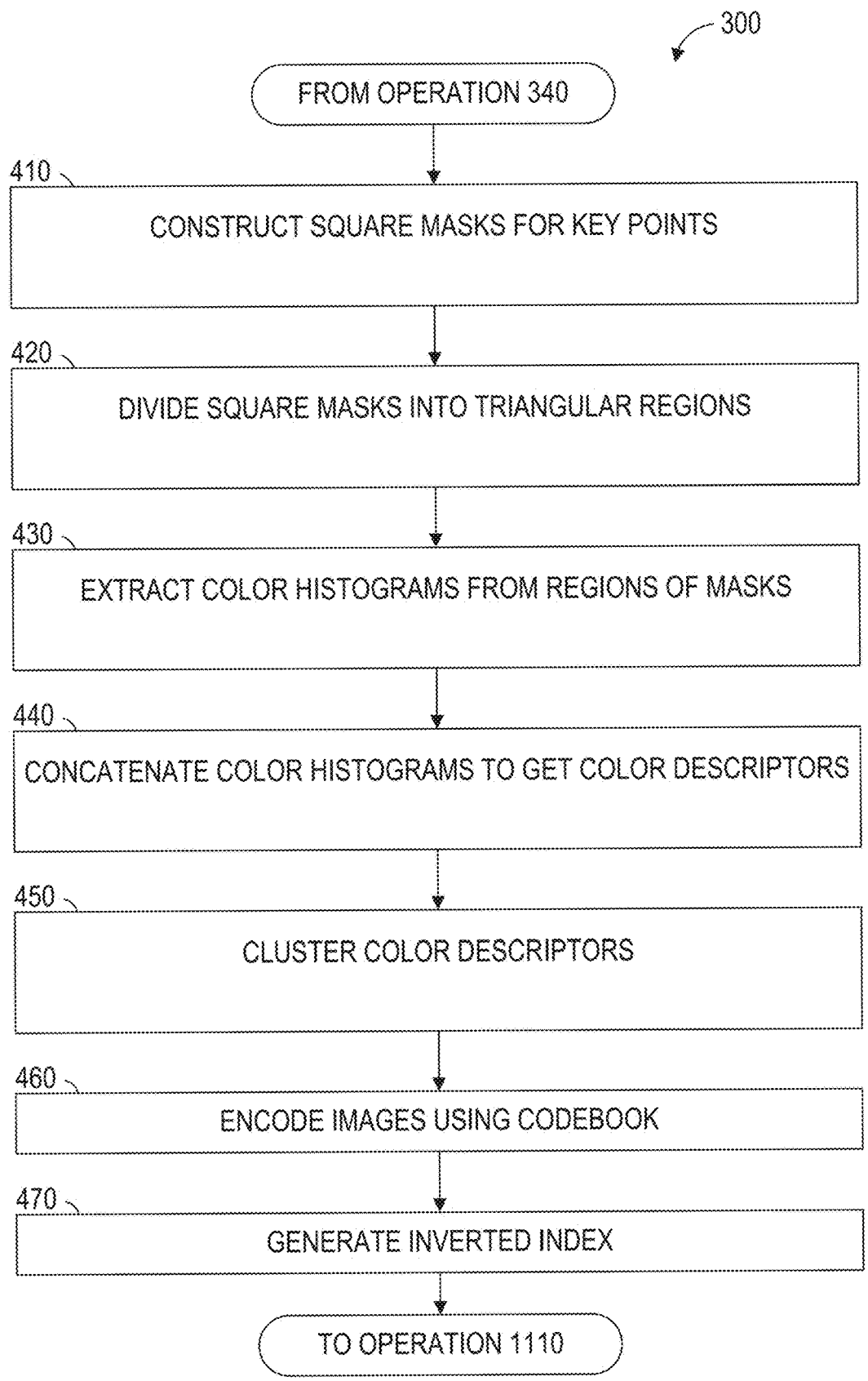

FIGS. 3 and 4 are flowcharts illustrating operations of the image processing machine 110 in performing a method 300 of analyzing one or more images, according to some example embodiments. Operations in the method 300 may be performed using modules described above with respect to FIG. 2, using one or more of the processors 299 (e.g., microprocessors or other hardware processors), or using any suitable combination thereof. As shown in FIG. 3, the method 300 may include one or more of operations 310, 320, 330, and 340 (e.g., as predecessor operations performed prior to additional operations).

Image analysis by the image processing machine 110 may begin with a BoW approach to generating (e.g., extracting) local feature descriptors (e.g., for forming clusters that represent visual words). In operation 310, the feature module 210 detects key points within one or more images (e.g., an image depicting a logo). This may be done using a local extrema detector, for example, based on differences of Gaussians (DoG). The feature module 210 may then compute local feature descriptors (e.g., SIFT descriptors) from the detected key points in each image. In some example embodiments, the database 115 stores a set of training images or reference images, and operation 310 may be applied (e.g., by the feature module 210) to each image in the database 115. The resulting local feature descriptors may be stored (e.g., in the database 115) for later use.

Each local feature descriptor may be represented as a d-dimensional vector $x_o^\theta$, where $\sigma$ and $\theta$ respectively represent the scale and dominant angle of the local feature descriptor. In operation 320, the cluster module 240 clusters the stored local feature descriptors generated in operation 310. For example, the clustering may be performed based on (e.g., according to, or otherwise using) a k-means algorithm to generate or update a descriptor vocabulary (e.g., a codebook) of visual words, where each visual word represents a cluster of similar local feature descriptors. The vocabulary of visual words may be denoted as $\mu=[\mu_1, \mu_2, \ldots, \mu_{K_1}]$, with a size $K_1$ (e.g., a pre-determined size) for a situation where there are $K_1$ clusters.

This descriptor vocabulary $\mu$ may now be used to encode each image $I=[I_1, I_2, \ldots I_n]$ in the set of training images or reference images (e.g., within the database 115), where n is the total number of images in the set. In operation 330, the cluster module 230 performs this encoding process (e.g., by mapping, signing, or otherwise correlating each image with one or more visual words from the descriptor vocabulary). The encoding (e.g., mapping) process may use a nearest-neighbor schema $N \; N(x_o^\theta)$ that maps each inputted d-dimensional local feature descriptor $x_o^\theta$ to its nearest d-dimensional visual word $\mu_i$, where $1 \leq i \leq K_1$. Thus, the presence or absence of each local feature descriptor $x_o^\theta$ within an image may be indicated by a visual word identifier $1 \leq i \leq K_1$.

In operation 340, the index module 250 generates (e.g., builds) an inverted index for the set of training images or reference images (e.g., within the database 115) based on the visual word identifiers used to encode the images within the set of training images or reference images. The inverted index may be built by storing each visual word identifier i as a key and a list of those training images $I_m$ that are closest to $\mu_i$ (e.g., within a threshold distance) as the value of the key. Thus, the inverted index for images containing various visual words may be represented as:

$$\text{IND}_{BoW}(i, \{I_m : I_m = NN(u_i)\}) \tag{1}$$

Local feature descriptors (e.g., SIFT descriptors) extracted from all key points in a given image may be representative of the whole image in general. However, for image matching and image retrieval (e.g., logo matching and logo retrieval), the image processing machine 110 may be particularly configured to identify those key points that correlate strongly to logo-like information. An example of such information is the color cues present in various logos. Hence, in addition to local feature descriptors, the image processing machine 110 may be configured to also extract color signatures (e.g., color histograms) from all key points and use these color signatures to select SPARrse Color-Localized (SPARCL) key points that exhibit strong activity in both local feature descriptor information and color information. Such strong activity is often found in logo regions detected by the DoG local extrema detector (e.g., in operation 310). Thus, a key point may be a single location (e.g., a single pixel location) within an image, and the key point may represent a local region (e.g., within a threshold pixel distance) of the image. For example, a key point may be a center or centroid of a spatial region within the image (e.g., a spatial region that exhibits strong activity in terms of local feature descriptor information, color information, or both). According to various example embodiments, each key point has a direction (e.g., an orientation), which may be treated as a first dimension of that key point, and a scale (e.g., size), which may be treated as a second dimension of that key point.

As shown in FIG. 4, the method 300 may include one or more of operations 410, 420, 430, 440, 450, 460, and 470. In operation 410, the mask module 220 constructs a localized square spatial mask (e.g., a square patch) $P(x_o^\theta)$ for each key point x, where the diagonal of the mask is along the direction (e.g., orientation) θ of the key point, and where each side of the square has a same length equal to the scale (e.g., size) σ of the key point. To capture spatial information around the local region of the key point x, the mask may be divided into multiple regions (e.g., four triangular regions). In operation 420, the mask module 220 performs this division. In some example embodiments, the mask module 220 performs operations 410 and 420 together by constructing the square mask with the multiple regions. Examples of such localized square spatial masks and their internal regions are illustrated in FIGS. 5-8, and FIGS. 9 and 10 show details of such a mask 920 for a key point 910 within an image 900.

Figure 5:
FIGS. 5-8 are example logo images, showing localized square spatial masks, according to some example embodiments.
Figure 6:
Figure 7:
Figure 8:
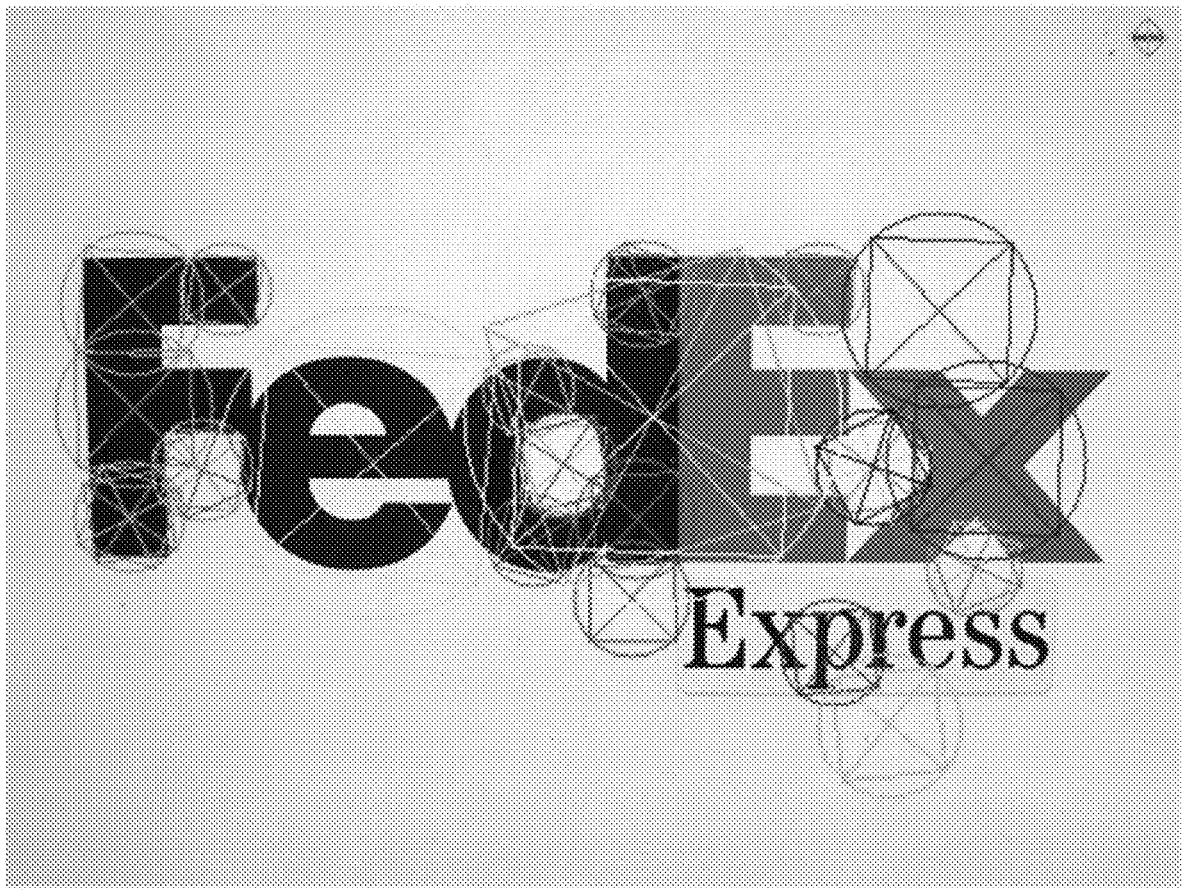

For example, in FIG. 5, localized square spatial masks for an image are shown in red, while triangular regions within the masks are indicated by lines of different colors (e.g., yellow, light green, dark green, purple, cyan, and magenta). As another example, in FIG. 6, localized square spatial masks for an image are shown in dark green, while triangular regions within the masks are indicated by lines drawn in other colors (e.g., red, purple, yellow medium blue, light blue, light green, and purple). Similarly, for the image shown in FIG. 7, localized square spatial masks are depicted as being transparent or light green where superimposed over a logo, and light green where superimposed over a background, while lines of other colors (e.g., cyan, purple, dark yellow, and dark green) indicate triangular regions within the masks. Likewise, for the image shown in FIG. 8, localized square masks are shown as being transparent (e.g., where superimposed over white or dark blue) or red (e.g., where superimposed over medium gray), and lines of different colors (e.g., magenta, purple, light green, dark green, cyan, and orange) are used indicate triangular regions within the masks.

Figure 9:
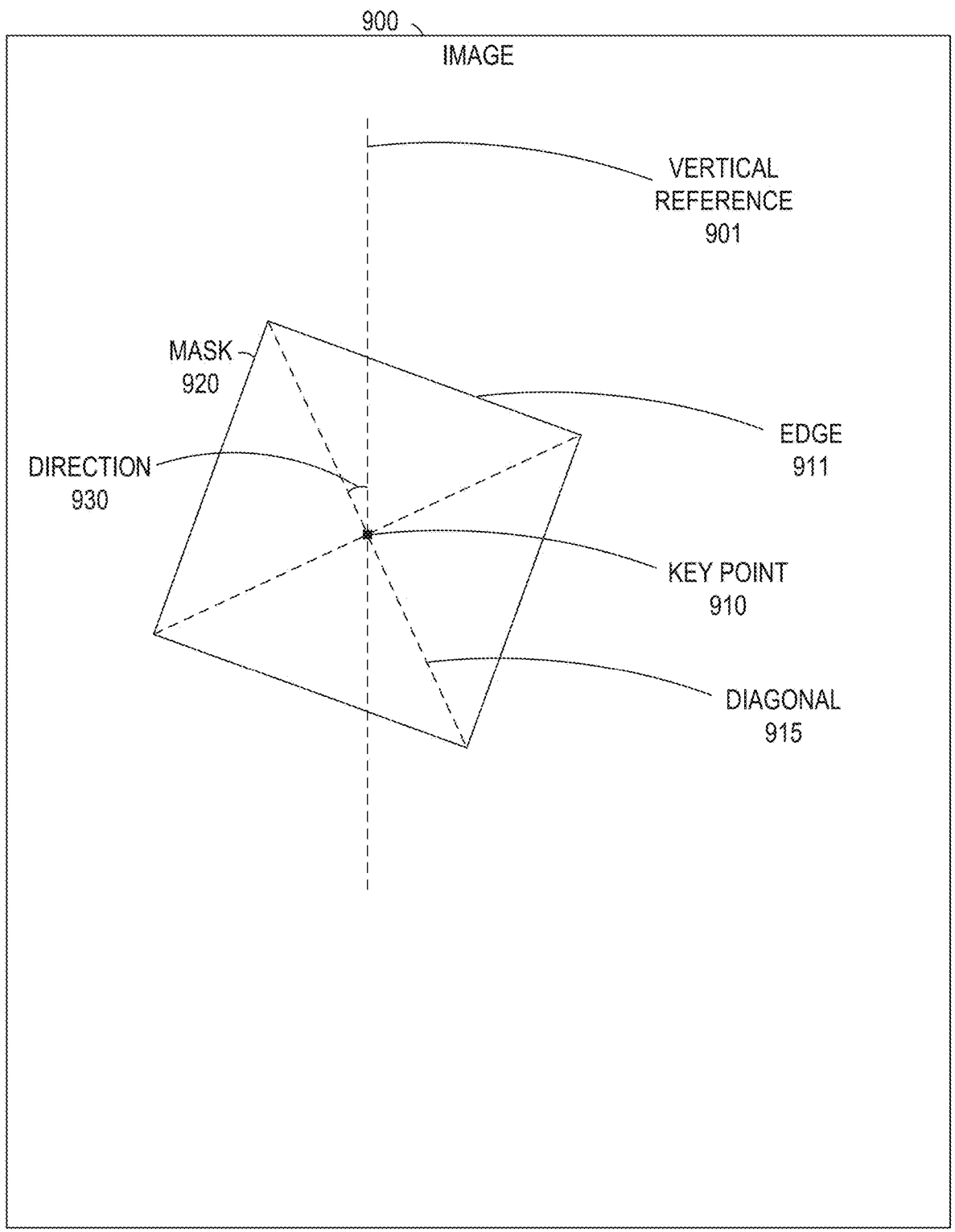
FIGS. 9 and 10 are block diagrams illustrating an example logo image with an identified key point and a corresponding localized square spatial mask, according to some example embodiments.

As shown in FIG. 9, the image 900 includes the key point 910, which has a corresponding direction 930 (e.g., orientation) and a scale (e.g., size). The mask 920 may be constructed so that a diagonal 915 of the mask 920 lies along the direction 930 (e.g., orientation) of the key point 910, and each edge of the square mask 920 (e.g., edge 911) is defined by the scale (e.g., size) of the key point 910. For example, the edge 911 may have a length equal to the scale of the key point 910. In other example embodiments, the length of the edge 911 is proportional to the scale. For clarity, a vertical reference 901 is shown in FIG. 9, for comparison to the direction 930 of the key point 910.

Figure 10:
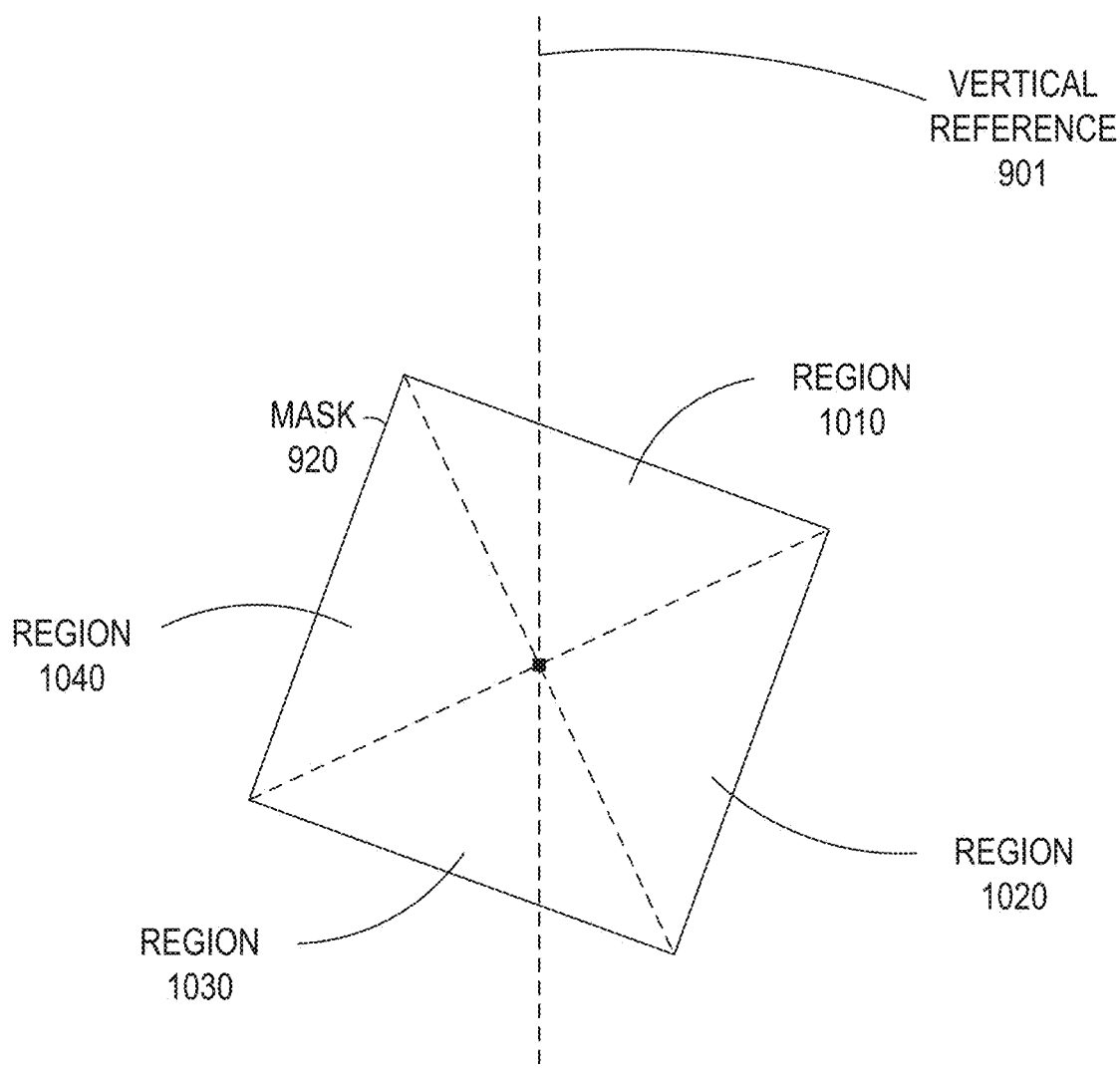

As shown in FIG. 10, the mask 920 may contain multiple regions 1010, 1020, 1030, and 1040, which may be the four symmetric triangles formed by the two diagonals (e.g., diagonal 915) of the square mask 920. In some example embodiments, the mask module 220 sets a sequential order of the regions 1010, 1020, 1030, and 1040 (e.g., the four triangles) to a clockwise direction, starting from the diagonal 915 pointed along the direction 930 of the key point 910. In alternative example embodiments, a counterclockwise direction is used. In addition, the sequential order may start from a different direction (e.g., 180 degrees opposite of the direction 930 of the key point 910).

Accordingly, this localized square spatial mask 920 may be considered as an ordered set of regions (e.g., the four triangular regions 1010, 1020, 1030, and 1040) placed in some local area of the image 900 (e.g., local to the key point 910 that corresponds to the mask 920). Information may then be extracted from each region (e.g., triangular regions 1010, 1020, 1030, and 1040) of the mask 920 and stored in the pre-defined sequential order. In particular, the image processing machine 110 may generate a new set of local descriptors (e.g., local color descriptors, distinct from the above-mentioned local feature descriptors) that are suitable for local spatial verification.

As described above, the size and orientation of a square mask (e.g., each square mask, such as mask 920) depends on the scale (e.g., the length of edge 911) and direction (e.g., direction 930) of its corresponding key point (e.g., key point 910). By basing (e.g., fixing) the scale and orientation of the mask to the scale and orientation of its key point (e.g., previously selected based on its local feature descriptors indicating strong activity in the region of the image local to the key point), it is possible to ensure scale and rotation invariance of features and also weigh the contribution of each descriptor accordingly. The shape and number of the internal regions (e.g., regions 1010, 1020, 1030, and 1040) of the square mask (e.g., mask 920) may vary according to various example embodiments. For example, many example embodiments utilize multiple regions inside each square mask (e.g., mask 920) for feature computation to benefit from the fact that their relative ordering (e.g., clockwise or counterclockwise) may capture localized spatial information about the image (e.g., image 900) in which a logo is depicted.

Returning to FIG. 4, once a localized square spatial mask (e.g., mask 920) with multiple regions (e.g., regions 1010, 1020, 1030, and 1040) has been constructed or otherwise accessed (e.g., obtain), the image processing machine 110 may extract features from each region (e.g., regions 1010, 1020, 1030, and 1040). For the task of logo retrieval, the image processing machine 110 may extract red-green-blue (RGB) color histograms. Using color not only provides the benefit of capturing the inherent color information present in brand logos, but also may serve as a computationally cheap and efficient feature that can be quickly computed. Accordingly, in operation 430 of the method 300, the color module 230 generates four RGB histograms (e.g., one from each of the triangular regions 1010, 1020, 1030, and 1040).

In operation 440 of the method 300, the color module 230 concatenates these RGB histograms in the sequential order previously determined for the mask (e.g., mask 920). For example, the sequential order may be clockwise from the direction 930 of the key point 910 (e.g., with the RGB histogram for the region 1010 appearing sequentially earlier than the RGB histogram for the region 1020). Various example embodiments may use a counterclockwise sequential order or other predefined sequential order. The color module 230 may store (e.g., in the database 115) the resulting concatenated histograms as a larger spatial color histogram (e.g., a 384-dimension descriptor) that corresponds to the key point (e.g., key point 910), and this larger spatial color histogram may be treated as a local color descriptor of that key point.

These stored local color descriptors may then be clustered using k-means to form the color vocabulary or color word $\gamma=[\gamma_1, \gamma_2, \ldots \gamma_{K_2}]$ of a chosen size $K_2$. As shown in FIG. 4, the cluster module 240 of the image processing machine 110 may perform this clustering in operation 450 of the method 300. This clustering may be performed in a manner similar to operation 320. As a result of this clustering, a vocabulary of color words may be denoted as $\gamma=[\gamma_1, \gamma_2, \ldots, \gamma_K]$, with a size $K_2$ (e.g., a pre-determined size) for a situation where there are $K_2$ clusters.

In operation 460 of the method 300, the index module 250 of the image processing machine 110 may encode the set of training images or reference images discussed above with respect to FIGS. 3 and 4 (e.g., stored within the database 115). Operation 460 may be performed in a manner similar to operation 330 in that the index module 250 may execute an encoding process similar to BoW but may replace each local color descriptor $y_\sigma^\theta$ with a color word identifier $1 \leq j \leq K_2$. Thus, the presence or absence of each local color descriptor $y_\sigma^\theta$ within an image (e.g., image 900) may be indicated by a color word identifier $1 \leq j \leq K_2$.

In operation 470, which may be performed similar to operation 340, the index module 250 generates (e.g., builds) an inverted index for the set of training images or reference images (e.g., within the database 115) based on color word identifiers. The inverted index may be built by storing each color word identifier j as a key and the set of those training images $I_n$ closest to $\gamma_j$ (e.g., within a threshold distance) as the value of the key. Thus, the inverted index for images containing various color words may be represented as:

$$\text{IND}_{CoL}(j, \{I_n : I_n = NN(\gamma_j)\}) \quad (2)$$

Figure 11:
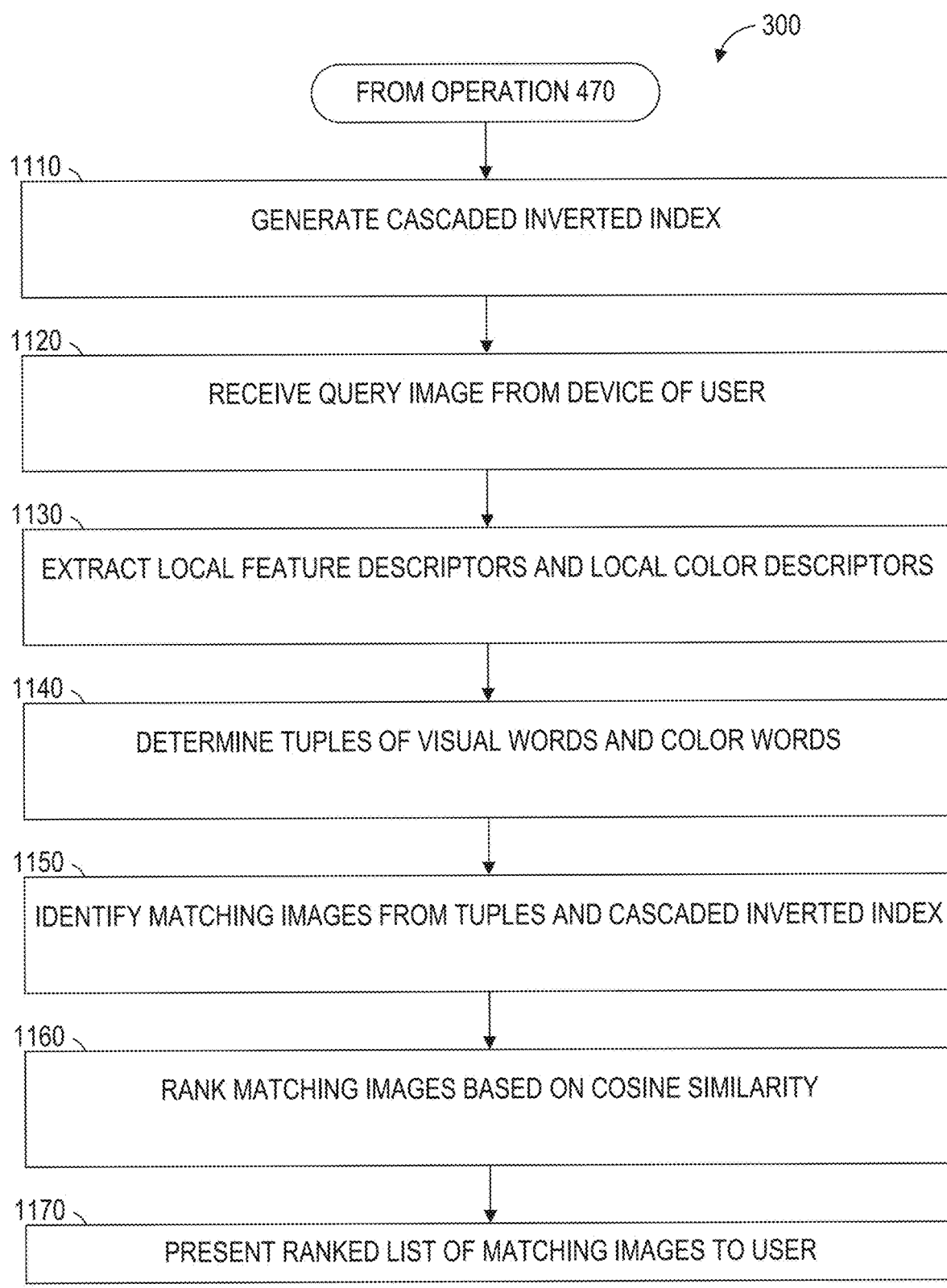
FIG. 11 is a flowchart illustrating operations of the image processing machine in performing the method of analyzing one or more images, according to some example embodiments.

As shown in FIG. 11, the method 300 may include generation of a cascaded inverted index in operation 1110, which may be performed by the index module 250 of the image processing machine 110. Such a cascaded inverted index may be generated based on the above-described inverted indices generated based on visual words and color words, and the resulting cascaded inverted index may correlate combinations or co-occurrences of visual and color words with corresponding images among the set of reference images or training images (e.g., stored in the database 115). Use of such a cascaded inverted index may enable the image processing machine 110 or any other image search engine to perform fast matching of images over both visual words and color words. According to various example embodiments, a cascaded inverted index may be represented as $$\text{IND}_{Bow,Col}(<i,j>, I_l : I_l = NN(\mu_i), I_l = NN(\gamma_j)) \quad (3)$$

This cascaded inverted index uses a tuple (e.g., pair) <i,j> as a key, where i is a visual word identifier and j is a color word identifier. Thus, the tuple <i,j> may represent a combination or co-occurrence of the visual word identifier with the color word identifier within an image (e.g., image 900). In the cascaded inverted index, the value of this tuple <i,j> may be a set of images $I_l$ such that the closest visual word to any image in set $I_l$ is i and the closest color word to any image in set $I_l$ is j. Thus, image processing machine 110 may add an additional localized spatial verification layer on top of a BoW-based (e.g., SIFT-based) inverted index (e.g., as generated in operation 340). The maximum possible number of keys in this cascaded index is $K=K_1 \times K_2$, which could be prohibitively large in terms of computational expense. However, in practice, these keys may be highly sparse, and the resulting cascaded inverted index may contain only a few non-empty keys (e.g., <i,j> pairs without any corresponding images). In some example embodiments, only roughly 7.5% of the keys contain non-empty image sets. This sparseness may be attributed to a lower probability $$\left(\frac{1}{K_1} \times \frac{1}{K_2}\right)$$

of each descriptor in the image being assigned to a particular <i,j> tuple. The index module 250 may then store the cascaded inverted index in the database 115 (e.g., for later use).

As shown in FIG. 11, the method 300 may also include one or more of operations 1120, 1130, 1140, 1150, 1160, and 1170 to perform retrieval and ranking of images (e.g., accessed from the database 115). The cascaded inverted index (e.g., as generated in operation 1110 and stored in the database 115) may facilitate quick retrieval of relevant training images or reference images as follows:

$$I_r = \{I_r^{i,j} : \forall x_\sigma^\theta \in I_q,$$

$$NN(\text{BoW}(x_\sigma^\theta))=i, NN(\text{Col}(x_\sigma^\theta))=j,$$

$$\text{IND}_{Bow,Col}(<i,j>, I_r^{i,j}) \neq \emptyset\}, \quad (4)$$

where $I_r$ is the set of relevant images retrieved using this two-level cascaded inverted index.

In operation 1120, the query module 260 of the image processing machine 110 receives a query image (e.g., a logo image like image 900 but received as a submission from the device 130 of the user 132) to be matched with similar images (e.g., stored in the database 115) already indexed by the cascaded inverted index (e.g., also stored in the database 115). In operation 1130, the feature module 210, the mask module 220, and the color module 230 respectively operate similar to operations 310, 410, 420, 430, and 440 to extract local feature descriptors and local color descriptors (e.g., concatenated spatial color histograms) from the query image. In operation 1140, the cluster module 240 determines the visual word identifiers i and color word identifiers j that respectively correspond to the local feature descriptors and local color descriptors of the query image. This determination may be based on the respective codebooks $K_1$ and $K_2$ discussed above with respect to operations 320 and 450. In some example embodiments, the cluster module 240 determines tuples (e.g., descriptor pairs, such as tuple <i,j>) of a visual word identifier with a color word identifier.

Figure 12:
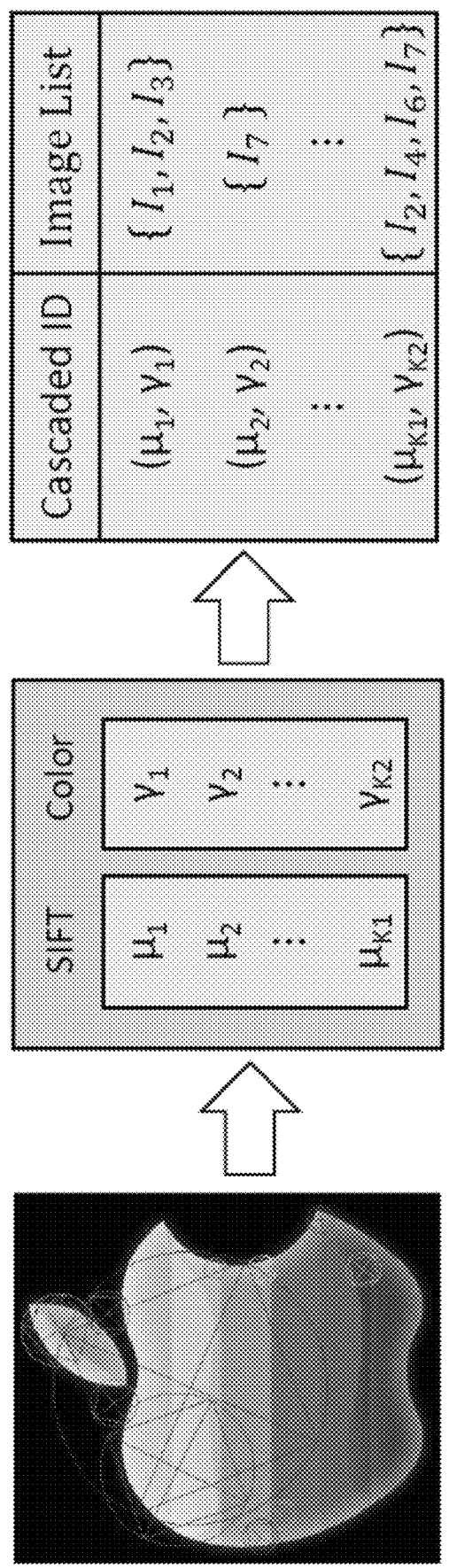
FIG. 12 is a conceptual diagram illustrating analysis of a query image and retrieval of matching images based on a cascaded inverted index of reference images or training images, according to some example embodiments.

In operation 1150, using one or more tuples <i,j> as keys for retrieval, the query module 260 queries the cascaded inverted index and identifies (e.g., for retrieval or other access) only those images (e.g., among the set of reference images or training images stored in the database 115) that exhibit the same combination or co-occurrence of a particular visual word identifier with a particular color word identifier at the same key point (e.g., key point 910) as the query image. This process is conceptually illustrated in FIG. 12, which shows an analysis of the query image and retrieval of matching images based on the cascaded inverted index, according to some example embodiments. As shown in FIG. 12, the query image depicts a logo against a black background, and localized square spatial masks of the query image are depicted with colors that contrast against the logo (e.g., light green, yellow, orange, red, and purple). The blue box illustrated in FIG. 12 represents computation of local feature descriptors (e.g., SIFT descriptors) from the key points in the query image and representation (e.g., encoding) of the computed local feature descriptors by a vocabulary of visual words. The pink box shown in FIG. 12 represents images being retrieved based on the cascaded inverted index.

This approach may provide a benefit in incurring no significant computational overhead compared to a traditional BoW implementation. According to certain example embodiments, even non-optimized code may take only 0.34 seconds on average for constructing spatial masks (e.g., mask 920) and extracting features from the high-resolution images.

In operation 1160, the similarity module 270 of the image processing machine 110 ranks (e.g., re-ranks) the set of images identified in operation 1150. In various example embodiments, the similarity module 270 ranks the output of operation 1150 according to cosine similarity between the visual words (e.g., clusters of local feature descriptors) of the query image and the visual words of each of the identified images. The same vocabulary size (e.g., $K_1$) that was used in operations 320, 330, and 340 may also be used for operation 1160.

In various example embodiments, the similarity module 270 may also calculate an average precision of matching, based on this ranked (e.g., re-ranked) list of identified images. A mean average precision (mAP) may be calculated by the image processing machine 110 and presented as a performance measure for retrieval. Accordingly, in operation 1170, the query module 260 of the image processing machine presents a ranked list of matching images to a user (e.g., user 132 via the device 130). Thus, the image processing machine 110 outputs a signal over the network 190 dependent upon the results of the matching process. The signal may include information on one or more matched images for display to the user 132 on the device 130. The ranked list may be presented with the mean average precision. Hence, the matching images may be presented based on the relevance of the retrieved results, as well as how far apart they appear in the list. The mean average precision may be calculated as follows:

$$mAP = \frac{\sum_{q=1}^{Q} AveP(q)}{Q} \quad (5)$$

where Q is the total number of queries, and AveP is the average precision of a given query.

In certain example embodiments, the similarity module 270 may also calculate a response ratio (RR), as an indicator of efficiency in retrieving similar images by using the cascaded inverted index. Accordingly, the response ratio may be calculated as, or based on, the ratio of the number of retrieved images to the total size of the images searched (e.g., the set of reference images or training images stored in the database 115). Generally, a lower response ratio indicates fewer images in the result list. Hence, lower response ratios may provide the benefit of reducing the computational complexity of post-processing the retrieved images. Thus, a lower response ratio may imply better efficiency in searching images (e.g., logo images).

According to various example embodiments, one or more of the methodologies described herein may facilitate identification of one or more images similar to a query image. Moreover, one or more of the methodologies described herein may facilitate presentation of a list of logo images similar to a logo image submitted as a query, where the list is ranked in order of similarity to the logo image. Hence, one or more of the methodologies described herein may facilitate matching and retrieval of images depicting logos.

When these effects are considered in aggregate, one or more of the methodologies described herein may obviate a need for certain efforts or resources that otherwise would be involved in identifying images that depict a given logo. Efforts expended by a user in identifying such images may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 13:
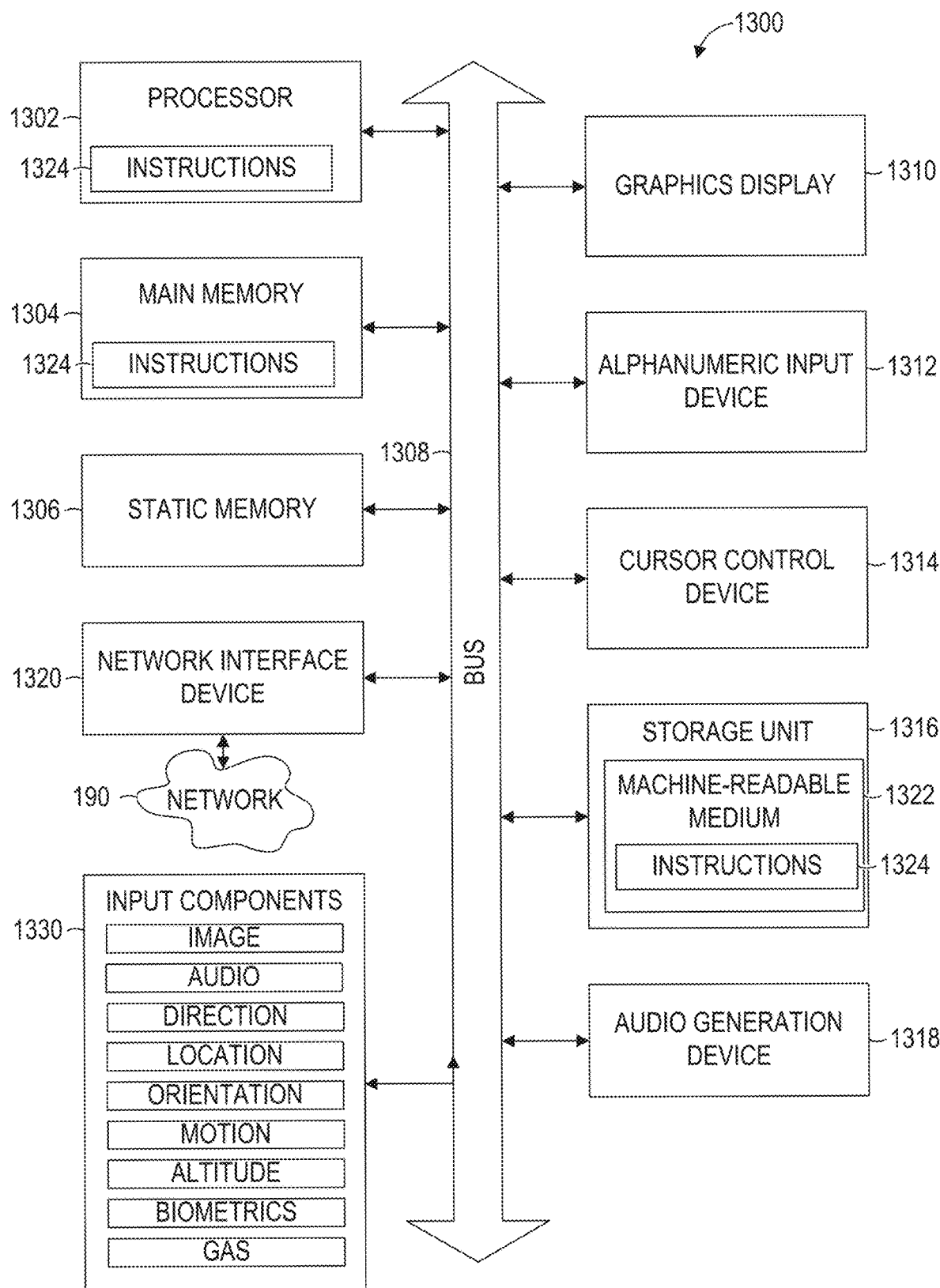
FIG. 13 is a block diagram illustrating components of a machine, according to some example embodiments, able to read instructions from a machine-readable medium and perform any one or more of the methodologies discussed herein.

FIG. 13 is a block diagram illustrating components of a machine 1300, according to some example embodiments, able to read instructions 1324 from a machine-readable medium 1322 (e.g., a non-transitory machine-readable medium, a machine-readable storage medium, a computer-readable storage medium, or any suitable combination thereof) and perform any one or more of the methodologies discussed herein, in whole or in part. Specifically, FIG. 13 shows the machine 1300 in the example form of a computer system (e.g., a computer) within which the instructions 1324 (e.g., software, a program, an application, an applet, an app, or other executable code) for causing the machine 1300 to perform any one or more of the methodologies discussed herein may be executed, in whole or in part.

In alternative embodiments, the machine 1300 operates as a standalone device or may be communicatively coupled (e.g., networked) to other machines. In a networked deployment, the machine 1300 may operate in the capacity of a server machine or a client machine in a server-client network environment, or as a peer machine in a distributed (e.g., peer-to-peer) network environment. The machine 1300 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1324, sequentially or otherwise, that specify actions to be taken by that machine. Further, while only a single machine is illustrated, the term "machine" shall also be taken to include any collection of machines that individually or jointly execute the instructions 1342 to perform all or part of any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The processor 1302 contains solid-state digital microcircuits (e.g., electronic, optical, or both) that are configurable, temporarily or permanently, by some or all of the instructions 1324 such that the processor 1302 is configurable to perform any one or more of the methodologies described herein, in whole or in part. For example, a set of one or more microcircuits of the processor 1302 may be configurable to execute one or more modules (e.g., software modules) described herein. In some example embodiments, the processor 1302 is a multicore CPU (e.g., a dual-core CPU, a quad-core CPU, or a 128-core CPU) within which each of multiple cores behaves as a separate processor that is able to perform any one or more of the methodologies discussed herein, in whole or in part. Although the beneficial effects described herein may be provided by the machine 1300 with at least the processor 1302, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1300 may further include a graphics display 1310 (e.g., a plasma display panel (PDP), a light emitting diode (LED) display, a liquid crystal display (LCD), a projector, a cathode ray tube (CRT), or any other display capable of displaying graphics or video). The machine 1300 may also include an alphanumeric input device 1312 (e.g., a keyboard or keypad), a cursor input device 1314 (e.g., a mouse, a touchpad, a trackball, a joystick, a motion sensor, an eye tracking device, or other pointing instrument), a data storage 1316, an audio generation device 1318 (e.g., a sound card, an amplifier, a speaker, a headphone jack, or any suitable combination thereof), and a network interface device 1320.

The data storage 1316 (e.g., a data storage device) includes the machine-readable medium 1322 (e.g., a tangible and non-transitory machine-readable storage medium) on which are stored the instructions 1324 embodying any one or more of the methodologies or functions described herein. The instructions 1324 may also reside, completely or at least partially, within the main memory 1304, within the processor 1302 (e.g., within the processor's cache memory), or both, before or during execution thereof by the machine 1300. Accordingly, the main memory 1304 and the processor 1302 may be considered machine-readable media (e.g., tangible and non-transitory machine-readable media). The instructions 1324 may be transmitted or received over the network 190 via the network interface device 1320. For example, the network interface device 1320 may communicate the instructions 1324 using any one or more transfer protocols (e.g., hypertext transfer protocol (HTTP)).

In some example embodiments, the machine 1300 may be a portable computing device (e.g., a smart phone, tablet computer, or a wearable device), and have one or more additional input components 1330 (e.g., sensors or gauges). Examples of such input components 1330 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1324 for execution by the machine 1300, such that the instructions 1324, when executed by one or more processors of the machine 1300 (e.g., processor 1302), cause the machine 1300 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1324 for execution by the machine 1300 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1324).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method (e.g., a computer-implemented image processing method using one or more processors) comprising:

by operation of one or more processors, generating a first inverted index that correlates first clusters of local feature descriptors with reference images among a set of reference images stored in a database, the local feature descriptors being generated based on the set of reference images;

by operation of one or more processors, generating a second inverted index that correlates second clusters of local color descriptors with reference images among the set of reference images stored in the database, the local color descriptors being generated based on the set of reference images, one of the local color descriptors being generated from a reference image among the set of reference images by concatenating color histograms generated from multiple regions of a square mask that corresponds to a key point within the reference image;

by operation of one or more processors, generating a third inverted index that correlates descriptor pairs with reference images among the set of reference images stored in the database, the descriptor pairs each representing a co-occurrence of a first cluster among the first clusters with a second cluster among the second clusters;

by operation of one or more processors, determining that a query image matches the reference image based on the third inverted index correlating a descriptor pair among the descriptor pairs with the reference image; and by operation of one or more processors, presenting or otherwise outputting the reference image determined to match the query image.

In this first embodiment and in any of the following embodiments, the outputting operation (e.g., outputting step) may include any output process, such as presenting the image, causing the image to be presented, displaying the image, causing the image to be displayed, communicating information on the image over a network, or any suitable combination thereof.

A second embodiment provides a method according to the first embodiment, wherein:
the generating of the first inverted index that correlates the first clusters with the reference images includes:
generating the local feature descriptors by analyzing the set of reference images stored in the database;
clustering the local feature descriptors to generate the first clusters of local feature descriptors; and
encoding the reference images among the set of reference images based on the first clusters of local feature descriptors.

The third embodiment provides a method according to the second embodiment, wherein:
each of the generated first clusters of local feature descriptors represents a different visual word within a codebook of visual words; and
the encoding of the reference images correlates the reference image with a set of visual words from the codebook of visual words.

A fourth embodiment provides a method according to any of the first through third embodiments, wherein:
the generating of the second inverted index that correlates the second clusters with the reference images includes:
generating the local color descriptors by analyzing the set of reference images stored in the database;
clustering the local color descriptors to generate the second clusters of local color descriptors; and
encoding the reference images among the set of reference images based on the second clusters of local color descriptors.

A fifth embodiment provides a method according to the fourth embodiment, wherein:
the generating of the local color descriptors by analyzing the reference images includes:
generating the mask that corresponds to the key point among multiple key points within the reference image by generating a quadrilateral mask that corresponds to the key point among multiple key points within the reference image;
dividing the generated quadrilateral mask into multiple regions;
generating color histograms of the multiple regions of the generated quadrilateral mask that corresponds to the key point within the reference image; and
concatenating the color histograms of the multiple regions of the quadrilateral mask.

A sixth embodiment provides a method according to the fifth embodiment, wherein:
the generating of the quadrilateral mask includes generating a square mask that corresponds to the key point within the reference image.

A seventh embodiment provides a method according to the fifth embodiment or the sixth embodiment, wherein:
the dividing the generated quadrilateral mask into multiple regions divides the quadrilateral mask into four triangular regions.

An eighth embodiment provides a method according to any of the fifth through seventh embodiments, wherein:
the concatenating of the color histograms of the multiple regions of the quadrilateral mask generates a local color descriptor that corresponds to the key point within the reference image.

A ninth embodiment provides a method according to any of the fourth through eighth embodiments, wherein:
each of the generated second clusters of local color descriptors represents a different color word within a codebook of color words; and
the encoding of the reference images correlates the reference image with a set of color words from the codebook of color words.

A tenth embodiment provides a method according to any of the first through ninth embodiments, wherein:
the generating of the third inverted index generates a cascaded inverted index based on the generated first and second inverted indices, the first inverted index correlating the reference image with a first set of visual words from a visual codebook of visual words, the second inverted index correlating the reference image with a second set of color words from a color codebook of color words.

An eleventh embodiment provides a method according to the tenth embodiment, wherein:
the cascaded inverted index correlates the reference image with a descriptor pair among the descriptor pairs, the correlated descriptor pair representing a co-occurrence of a visual word among the first set of visual words with a color word among the second set of color words.

A twelfth embodiment provides a method according to any of the first through eleventh embodiments, further comprising:
receiving the query image within a query from a device of a user; and
accessing the generated third inverted index that correlates the descriptor pairs with reference images in response to the receiving of the query image; and wherein
the presenting or otherwise outputting of the reference image determined to match the query image is in response to the query received from the device of the user.

A thirteenth embodiment provides a method according to the twelfth embodiment, further comprising:
generating local feature descriptors of the query image and local color descriptors of the query image; and
determining tuples that pair each of the generated local feature descriptors of the query image with a corresponding one of the local color descriptors of the query image; and wherein
the determining that the query image matches the reference image includes matching a tuple among the determined tuples with the descriptor pair correlated with the reference image by the third inverted index.

A fourteenth embodiment provides a method according to the twelfth embodiment or the thirteenth embodiment, further comprising:
determining that a subset of the reference images matches the query image based on the third inverted index correlating a subset of the descriptor pairs with the subset of the reference images; and
ranking the subset of the reference images based on cosine similarity to the query image; and wherein
the presenting or otherwise outputting of the reference image determined to match the query image is based on the ranked subset of the reference images.

A fifteenth embodiment provides a system (e.g., image processing system) comprising:
one or more processors; and
memory storing instructions that, when executed by the one or more processors, cause the one or more processors to perform operations comprising:
generating a first inverted index that correlates first clusters of local feature descriptors with reference images among a set of reference images stored in a database, the local feature descriptors being generated based on the set of reference images;
generating a second inverted index that correlates second clusters of local color descriptors with reference images among the set of reference images stored in the database, the local color descriptors being generated based on the set of reference images, one of the local color descriptors being generated from a reference image among the set of reference images by concatenating color histograms generated from multiple regions of a square mask that corresponds to a key point within the reference image;
generating a third inverted index that correlates descriptor pairs with reference images among the set of reference images stored in the database, the descriptor pairs each representing a co-occurrence of a first cluster among the first clusters with a second cluster among the second clusters;
determining that a query image matches the reference image based on the third inverted index correlating a descriptor pair among the descriptor pairs with the reference image; and
presenting or otherwise outputting the reference image determined to match the query image.

A sixteenth embodiment provides a system according to the fifteenth embodiment, wherein:
the generating of the first inverted index that correlates the first clusters with the reference images includes:
generating the local feature descriptors by analyzing the set of reference images stored in the database;
clustering the local feature descriptors to generate the first clusters of local feature descriptors; and
encoding the reference images among the set of reference images based on the first clusters of local feature descriptors.

A seventeenth embodiment provides a system according to the fifteenth embodiment or the sixteenth embodiment, wherein:
the generating of the second inverted index that correlates the second clusters with the reference images includes:
generating the local color descriptors by analyzing the set of reference images stored in the database;
clustering the local color descriptors to generate the second clusters of local color descriptors; and
encoding the reference images among the set of reference images based on the second clusters of local color descriptors.

An eighteenth embodiment provides a system according to the seventeenth embodiment, wherein:
the generating of the local color descriptors by analyzing the reference images includes:
generating the mask that corresponds to the key point among multiple key points within the reference image by generating a quadrilateral mask that corresponds to the key point among multiple key points within the reference image;
dividing the generated quadrilateral mask into multiple regions;
generating color histograms of the multiple regions of the generated quadrilateral mask that corresponds to the key point within the reference image; and
concatenating the color histograms of the multiple regions of the quadrilateral mask.

A nineteenth embodiment provides a system according to the eighteenth embodiment, wherein:
the generating of the quadrilateral mask includes generating a square mask that corresponds to the key point within the reference image;
the dividing the generated quadrilateral mask into multiple regions divides the quadrilateral mask into four triangular regions; and
the concatenating of the color histograms of the multiple regions of the quadrilateral mask generates a local color descriptor that corresponds to the key point within the reference image.

A twentieth embodiment provides a machine readable medium (e.g., a non-transitory machine-readable storage medium) storing or otherwise comprising instructions that, when executed by one or more processors of a machine (e.g., image processing machine 110), cause the machine to perform operations comprising:
generating a first inverted index that correlates first clusters of local feature descriptors with reference images among a set of reference images stored in a database, the local feature descriptors being generated based on the set of reference images;
generating a second inverted index that correlates second clusters of local color descriptors with reference images among the set of reference images stored in the database, the local color descriptors being generated based on the set of reference images, one of the local color descriptors being generated from a reference image among the set of reference images by concatenating color histograms generated from multiple regions of a square mask that corresponds to a key point within the reference image;
generating a third inverted index that correlates descriptor pairs with reference images among the set of reference images stored in the database, the descriptor pairs each representing a co-occurrence of a first cluster among the first clusters with a second cluster among the second clusters;

determining that a query image matches the reference image based on the third inverted index correlating a descriptor pair among the descriptor pairs with the reference image; and presenting or otherwise outputting the reference image determined to match the query image.

A twenty first embodiment provides a carrier medium carrying machine-readable instructions for controlling a machine to carry out the method of any one of the previously described embodiments.

What is claimed is:

1. A system allowing for logo image matching, comprising:
    a processor;
    a network interface device; and
    a storage device having stored thereon computer instructions executable by the system to cause the system to perform operations comprising:
    receiving a first real-world image comprising a visual depiction of one or more physical objects;
    identifying, within the first real-world image, a graphical logo portrayed on a first physical object of the one or more physical objects, the identifying comprising:
    selecting a portion of the first image;
    capturing spatial color information for the portion of the first image;
    calculating a color-localized image representation for the portion of the first image based on the spatial color information; and
    performing a two-level indexing process of the first image using both the color-localized image representation for the portion of the first image and the spatial color information for the portion of the first image; and
    based on identifying the graphical logo, responding to a user request.

2. The system of claim 1, wherein the identifying further comprises:
    generating a first index that correlates first clusters of local feature descriptors with reference images of a plurality of reference images, the local feature descriptors generated from the plurality of reference images;
    generating a second index that correlates second clusters of local color descriptors with reference images of the plurality of reference images, one of the local color descriptors generated from a reference image among the set of reference images based on color histograms generated from multiple regions that correspond to a key point within the reference image;
    generating a third index that correlates descriptor pairs with reference images from the plurality of reference images, the descriptor pairs representing respective co-occurrences of a first cluster of the local feature descriptors with a second cluster of the local color descriptors;
    wherein the identifying is based on the third index correlating a descriptor pair among the descriptor pairs with the reference image.

3. The system of claim 1, wherein the user request is a query submitted via an Internet enabled computing device.

4. The system of claim 3, wherein the query specifies a sample logo image as part of the query and wherein the query seeks other images having similarity to the sample logo image.

5. The system of claim 1, wherein responding to the user request comprises causing a display of the first-real world image.

6. The system of claim 1, wherein the operations further comprise:
    searching for the graphical logo in a plurality of real-world images including the first real-world image.

7. A method, comprising:
    receiving, at a computer system, a first real-world image comprising a visual depiction of one or more physical objects;
    the computer system identifying, within the first real-world image, a graphical logo portrayed on a first physical object of the one or more physical objects, the identifying comprising:
    selecting a portion of the first image;
    capturing spatial color information for the portion of the first image;
    calculating a color-localized image representation for the portion of the first image based on the spatial color information; and
    performing a two-level indexing process of the first image using both the color-localized image representation for the portion of the first image and the spatial color information for the portion of the first image; and
    based on identifying the graphical logo, responding to a user request.

8. The method of claim 7, wherein the first physical object is a manufactured article having the graphical logo affixed thereto.

9. The method of claim 8, wherein the manufactured article is a piece of clothing.

10. The method of claim 7, wherein the manufactured article is a household good.

11. The method of claim 7, wherein the identifying further comprises:
    generating a first index that correlates first clusters of local feature descriptors with reference images of a plurality of reference images, the local feature descriptors generated from the plurality of reference images;
    generating a second index that correlates second clusters of local color descriptors with reference images of the plurality of reference images, one of the local color descriptors generated from a reference image among the set of reference images based on color histograms generated from multiple regions that correspond to a key point within the reference image;
    generating a third index that correlates descriptor pairs with reference images from the plurality of reference images, the descriptor pairs representing respective co-occurrences of a first cluster of the local feature descriptors with a second cluster of the local color descriptors;
    wherein the identifying is based on the third index correlating a descriptor pair among the descriptor pairs with the reference image.

12. The method of claim 7, wherein the user request is made by a user from a mobile computing device.

13. The method of claim 7, wherein a bag-of-words (BoW) approach is used to generate the color-localized image representation.

14. The method of claim 7, further comprising detecting one or more key points of the first image and using those key points to compare the first image to a plurality of real-world images stored in a database, the plurality of real-world images corresponding to a plurality of graphical logos.

15. The method of claim 7, wherein the graphical logo is a trademarked logo of a corporation.

16. A non-transitory computer-readable medium having instructions stored thereon that are executable by a computer system to cause the computer system to perform operations comprising:
   receiving a first real-world image comprising a visual depiction of one or more physical objects;
   identifying, within the first real-world image, a graphical logo portrayed on a first physical object of the one or more physical objects, the identifying comprising:
   selecting a portion of the first image;
   capturing spatial color information for the portion of the first image;
   calculating a color-localized image representation for the portion of the first image based on the spatial color information
   performing a two-level indexing process of the first image using both the color-localized image representation for the portion of the first image and the spatial color information for the portion of the first image; and
based on identifying the graphical logo, responding to a user request.

17. The non-transitory computer-readable medium of claim 16, wherein the user request specifies a sample logo image as part of the request.

18. The non-transitory computer-readable medium of claim 16, wherein a bag-of-words (BoW) approach is used to generate the color-localized image representation.

19. The non-transitory computer-readable medium of claim 16, wherein the color-localized image representation includes feature descriptors represented as multidimensional vectors.

20. The non-transitory computer-readable medium of claim 16, wherein the operations further comprise identifying key points in the first image based on color histogram information, and wherein the identifying is based on analysis of the key points.

* * * * *